US012800819B2

(12) United States Patent
Huang et al.

(10) Patent No.: US 12,800,819 B2
(45) Date of Patent: Nov. 17, 2026

(54) BACKLIGHT MODULE AND DISPLAY DEVICE

(71) Applicant: HKC CORPORATION LIMITED, Shenzhen (CN)

(72) Inventors: Hao Huang, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 296 days.

(21) Appl. No.: 18/636,565

(22) Filed: Apr. 16, 2024

(65) Prior Publication Data

US 2024/0353604 A1 Oct. 24, 2024

(30) Foreign Application Priority Data

Apr. 19, 2023 (CN) ......................... 202310440534.5

(51) Int. Cl.
*F21V 8/00* (2006.01)
*G02F 1/13357* (2006.01)

(52) U.S. Cl.
CPC ......... *G02B 6/0016* (2013.01); *G02B 6/0023* (2013.01); *G02B 6/0065* (2013.01); *G02B 6/0088* (2013.01); *G02B 6/009* (2013.01); *G02F 1/133615* (2013.01)

(58) Field of Classification Search
CPC ........................ G02B 6/0023; G02F 1/133615
See application file for complete search history.

(56) References Cited

FOREIGN PATENT DOCUMENTS

| | | | | | |
|---|---|---|---|---|---|
| CN | 103499054 | A | | 1/2014 | |
| CN | 104048221 | A | | 9/2014 | |
| CN | 104849910 | A | * | 8/2015 | ........... G02B 6/0013 |
| CN | 106054449 | A | * | 10/2016 | ....... G02F 1/133603 |
| CN | 106319554 | A | * | 1/2017 | ............... C25B 1/00 |
| CN | 108828838 | A | | 11/2018 | |
| CN | 109946879 | A | | 6/2019 | |
| JP | H08262438 | A | | 10/1996 | |
| KR | 20110068110 | A | * | 6/2011 | ........... G02B 6/0023 |

OTHER PUBLICATIONS

CN-106319554-A English translation (Year: 2017).*
KR-20110068110-A English translation (Year: 2011).*
Office Action issued on Mar. 29, 2025, in corresponding Chinese Application No. 202310440534.5, 17 pages.

* cited by examiner

*Primary Examiner* — Charlie Y Peng
(74) *Attorney, Agent, or Firm* — Maier & Maier, PLLC

(57) ABSTRACT

A backlight module and a display device. The backlight module includes a light source, a light guide plate, and a connection layer; the connection layer is sandwiched between the light source and the light guide plate, and is in contact with the light source and the light guide plate respectively; the connection layer is formed based on a viscous material and is configured to transmit light emitted by the light source, which can achieve the buffering effect through the viscous material of the connection layer, and the light source will not produce adverse effects even if being squeezed. Further, the gap between the light source and the light guide plate can also be filled by the connection layer, which is approximately equivalent to making the light source being closer to the light guide plate.

18 Claims, 5 Drawing Sheets

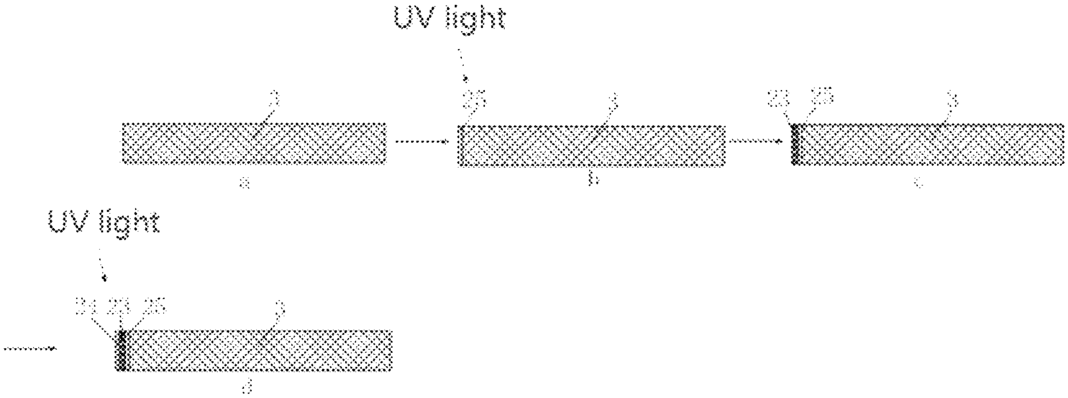
FIG. 7
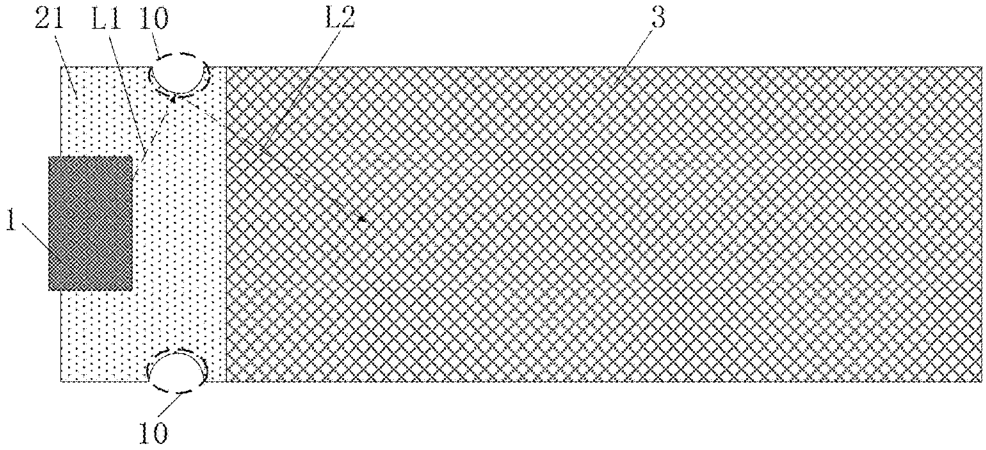
FIG. 8
| Refractive index of adhesive layer | 1.4 | 1.45 | 1.5 | 1.55 | 1.6 | PMMA (550nm refractive index is 1.49) | without adhesive layer (h=4mm, d=1mm) |
|---|---|---|---|---|---|---|---|
| Brightness/(cd/m-2) | 1039.2 | 1041.9 | 1041.3 | 1040.6 | 1030.1 | 1047.1 | 870 |
| Increment value/(%) | 19.45 | 19.76 | 19.69 | 19.61 | 18.4 | 20.36 | - |
FIG. 9

BACKLIGHT MODULE AND DISPLAY DEVICE

CROSS REFERENCE TO RELATED APPLICATION

This application claims priority to Chinese Patent Application No. 202310440534.5, filed on Apr. 19, 2023, which is incorporated herein by reference as in case that fully set forth herein.

TECHNICAL FIELD

The present application relates to the field of display technology, and more particularly to a backlight module and a display device.

BACKGROUND

The backlight module in a liquid crystal display (LCD) includes a light source, an optical film, etc., which can provide light with sufficient brightness for the display device to achieve the display function of the liquid crystal display device. With the continuous development of technology, a higher requirement for the display quality of the liquid crystal display devices is put forward. However, due to the fact that the brightness and color gamut of the conventional liquid crystal display devices cannot be effectively improved, high-quality display effects cannot be provided and user experience is poor.

Therefore, it is urgent to provide a new type of the liquid crystal display device to achieve high brightness and high color gamut.

SUMMARY

In view of this, an embodiment of the present application provides a backlight module and a display device, the connection layer is arranged to be sandwiched between the light source and the light guide plate, and is in contact with the light source and the light guide plate respectively; the connection layer is formed based on a viscous material and is configured to transmit light emitted by the light source, which can achieve the buffering effect through the viscous material of the connection layer, and the light source will not produce adverse effects even if being squeezed. Further, the gap between the light source and the light guide plate can also be filled by the connection layer, which is approximately equivalent to making the light source being closer to the light guide plate, so that most of the light emitted by the light source enters the light guide plate through the connection layer and then being emitted to outside, the brightness of the backlight module can be significantly improved and thereby the brightness of the display device applying the backlight module can be significantly improved.

A first aspect of the present application is provide with a backlight module, which includes a light source, a light guide plate, and a connection layer; the connection layer is sandwiched between the light source and the light guide plate, and is contact with the light source and the light guide plate respectively; and the connection layer is formed based on a viscous material and is configured to transmit a light emitted by the light source.

In an embodiment, the viscous material includes a transparent adhesive; or the viscous material includes a transparent adhesive and quantum dots, and the quantum dots are doped in the transparent adhesive.

In an embodiment, the connection layer includes a viscous layer and a quantum dot layer, and the viscous material of the viscous layer at least includes a transparent adhesive; the viscous layer includes a first sub viscous layer and a second sub viscous layer, and the first sub viscous layer is in contact with the light source, and the second sub viscous layer is in contact with the light guide plate; and the quantum dot layer is located between the first sub viscous layer and the second sub viscous layer, and configured for being in contact with the first sub viscous layer and the second sub viscous layer, respectively.

In an embodiment, the viscous material further includes a transparent graphene, and the transparent graphene is doped in the transparent adhesive.

In an embodiment, the light source, the connection layer, and the light guide plate are integrally formed.

In an embodiment, a surface of the connection layer being in contact with the light source is a first surface, and a surface of the connection layer being in contact with the light guide plate is a second surface; and at least one of all surfaces of the connection layer excluding the first surface and the second surface, is provided with concave dots.

In an embodiment, an absolute value of a difference value between a refractive index of the transparent adhesive and a refractive index of a material of the light guide plate is ranged from 0.01 to 0.11.

In an embodiment, a color of the light emitted by the light source is blue.

In an embodiment, the light source is a side-light type light source.

A second aspect of the present application provides a display device, which includes a display panel and a backlight module; the display panel is located at a light-emitting side of the backlight module, and the backlight module is the backlight module provided in the first aspect.

The backlight module provided in the first aspect of the embodiment of the present application includes the light source, the light guide plate, and the connection layer; the connection layer is arranged to be sandwiched between the light source and the light guide plate, and is in contact with the light source and the light guide plate respectively; the connection layer is formed based on a viscous material and is configured to transmit light emitted by the light source. Therefore, on one hand, the viscous material in the connection layer is relatively soft, which can achieve the buffering effect due that the viscous material is directly in contact with the light source, thus the light source will not produce adverse effects even if being squeezed; on the other hand, the gap between the light source and the light guide plate can also be filled by the connection layer, which is approximately equivalent to making the light source being closer to the light guide plate, so that most of the light emitted by the light source enters the light guide plate through the connection layer and then being emitted to outside, the brightness of the backlight module can be significantly improved and thereby the brightness of the display device applying the backlight module can be significantly improved, for example, it can increase the brightness of the display device by about 20%, and a high brightness display device has been implemented.

It can be understood that the beneficial effects of the second aspect mentioned above can be found in the relevant description in the first aspect, which will not be further repeated here.

BRIEF DESCRIPTION OF THE DRAWINGS

In order to explain the embodiments of the present invention more clearly, a brief introduction regarding the accompanying drawings that need to be used for describing the embodiments of the present invention or the prior art is given below; it is obvious that the accompanying drawings described as follows are only some embodiments of the present invention, for those skilled in the art, other drawings can also be obtained according to the current drawings on the premise of paying no creative labor.

FIG. 7 is a second manufacturing process of an adhesive material and a light guide plate provided in Embodiment 1 of the present application;

FIG. 8 is a structural schematic diagram of a backlight module provided in Embodiment 1 of the present application;

FIG. 9 is a relationship diagram of a refractive index of a transparent adhesive and ta brightness and increment values of the display device provided in Embodiment 1 of the present application;

DETAILED DESCRIPTION OF EMBODIMENTS

Figure 1:
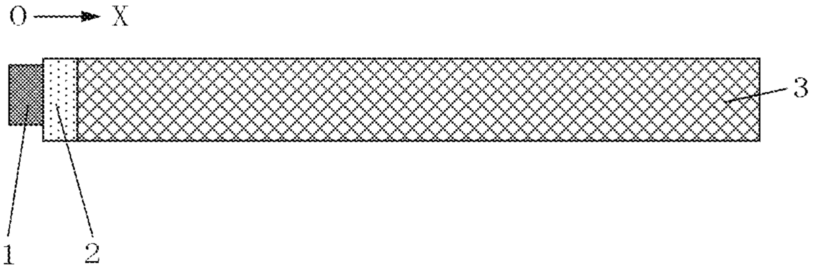
FIG. 1 is a structural schematic diagram of a light source, a connection layer, and a light guide plate in a backlight module provided in Embodiment 1 of the present application.

In order to enable those skilled in the art to better understand the present application solution, the following will clearly describe the technical solution in the embodiments of the present application in conjunction with the accompanying drawings. Obviously, the described embodiments are a part of the embodiments of the present application, not the entire embodiment. Based on the embodiments in the present application, all other embodiments obtained by those skilled in the art without creative labor shall fall within the scope of protection in the present application.

The term "including" and any variations thereof in the specification and claims of the present application, as well as the accompanying drawings, are intended to cover non exclusive inclusion. For example, a process, a method, or a system, a product, or a device that includes a series of steps or units is not limited to the listed steps or units, but optionally includes steps or units that are not listed, or optionally includes other steps or units inherent to these processes, methods, products, or devices. In addition, the terms "first" and "second" are used to distinguish different objects, rather than to describe a specific order.

Embodiment 1

As shown in FIGS. 1 to 4, the embodiment of the present application provides a backlight module, which includes a light source 1, a connection layer 2 and a light guide plate 3. The connection layer 2 is sandwiched between the light source 1 and the light guide plate 3, and is in contact with the light source 1 and the light guide plate 3 respectively. The connection layer 2 is formed based on a viscous material and configured to transmit a light emitted by the light source.

The type and amount of the above light sources are not limited here. For example, the light source can include a light emitting diode (LED), etc. Specifically, the light source can include a Micro light emitting diode (MicroLED), a Mini Light Emitting Diode (Mini LED), etc. For example, the number of the above light sources can be one; or, the number of light sources can be more than one.

It should be noted that, taking the light source being a LED as an example, the light source in the present application can be formed by packaging the LED chip on the substrate, then sealing the LED chip by a protective adhesive to form a sealant layer; thus the LED chip is protected by the sealant layer to prevent water, oxygen and other from intruding the LED chip.

The type of the above backlight module is not limited here, for example, the above backlight module can include a side-light type backlight module, the side-light type backlight module is that the light source (LED light strip) is arranged on the edge of the backplane of the backlight module, the light emitted by the LED light strip enters the light guide plate from a light-entering surface of a side of the light guide plate, and the light is then emitted from a light-emitting surface of the light guide plate after reflection and diffusion to form a surface light source being provided the liquid crystal display panel in the liquid crystal display device. FIGS. 1 to 4 show the side-light type backlight module including an LED light strip.

The color of the light emitted by the above light source is not limited here, and the color of the light emitted by the above light source can be determined according to the connection layer. For example, when the material of the connection layer includes quantum dots or the connection layer includes a quantum dot layer, the color of the light emitted by the above light source can be blue, and the blue light can be converted into green light and red light through the connection layer, and the wavelength distributions of green light and red light are very narrow, which can be well matched with the high transmittance band of the color filter in the liquid crystal display device, so as to reduce the loss of light, and the light efficiency is effectively improved. For example, when the material of the connection layer includes only transparent adhesive, the color of the light emitted by the above light source can be white, which can effectively improve the light efficiency.

The structure of the light guide plate is not limited here. For example, the light guide plate can have a plurality of dots, the dots are micro-structures, the micro-structure refers to the structure with micron size, the micro-structure of the dots can be located on the light-emitting side of the light guide plate. The shape of the dots is not specified, for example, the dots can be concave dots; alternatively, the dots can be convex dots. the micro-structure of the dots on the surface of the light guide plate can output light. In other embodiments, the micro-structure of the dots do not arrange on the surface of the light guide plate, which can also output light.

The connection layer being sandwiched between the light source and the light guide plate and being in contact with the light source and the light guide plate respectively means that the connection layer located between the light source and the light guide plate is in direct contact with the light source, and the connection layer is in direct contact with the light guide plate, so that the light source, the connection layer and the light guide plate form an overall structure through the connection layer.

Figure 2:
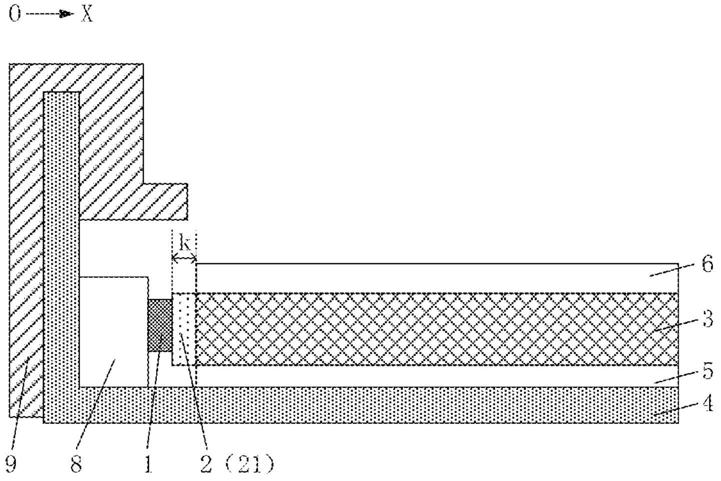
FIG. 2 is a structural schematic diagram of a first structure of a backlight module provided in Embodiment 1 of the present application.
Figure 3:
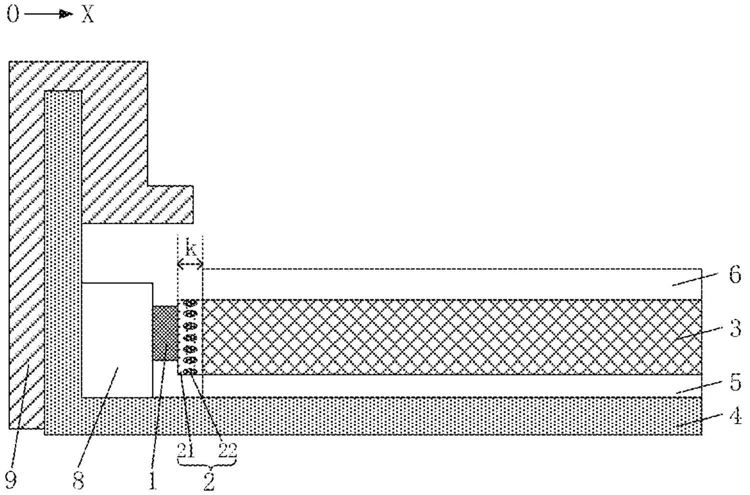
FIG. 3 is a structural schematic diagram of a second structure of a backlight module provided in Embodiment 1 of the present application.
Figure 4:
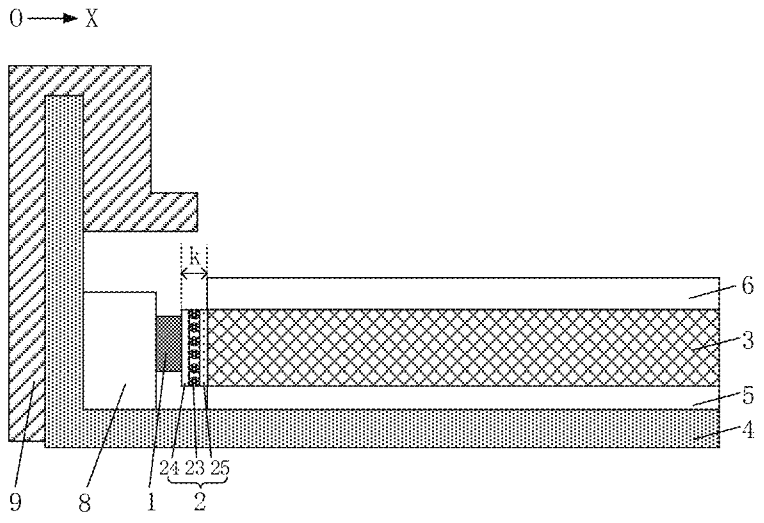
FIG. 4 a structural schematic diagram of a third structure of a backlight module provided in Embodiment 1 of the present application.

It should be noted that, first, as shown in FIGS. 2 to 4, the backlight module can also include a backplane 4, a reflecting sheet 5, an optical film 6, a Printed Circuit Board (PCB) 8 and a plastic frame 9 and other structures. As shown in FIGS. 2 to 4, the optical film 6 can include a diffusion sheet, etc. In addition, only the content related to the invention point is introduced here, and the rest of the structure can be obtained by referring to related technologies.

Second, as shown in FIGS. 2 to 4, the width k of the connection layer 2 along a first direction (OX direction shown in FIGS. 1 to 3) is less than 0.2 mm. The width of the connection layer along the first direction is not specified, for example, the width of the connection layer along the first direction can be 0.01 mm, 0.05 mm, 0.1 mm, 0.12 mm, 0.15 mm or 0.19 mm, etc. In the existing backlight module, the distance between the light source and the light guide plate should be maintained at 0.2 mm or even larger to reduce/avoid the problem of the light source and light guide plate. However, the present application can make the light source and light guide plate close together by providing the width k of the connection layer 2 in the first direction to be less than 0.2 mm.

Figure 5:
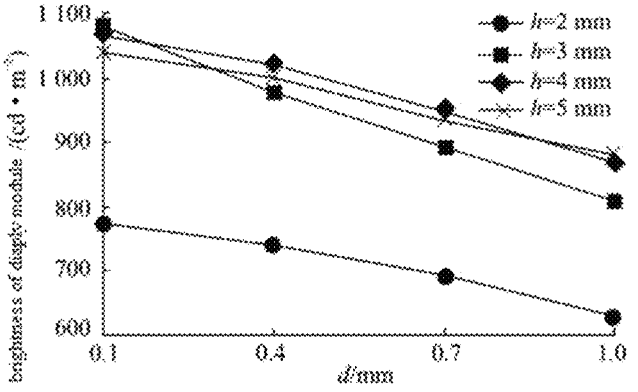
FIG. 5 is a schematic diagram of a brightness of a display device changing with the distance between a light source and a light-entering surface of a light guide plate provided in Embodiment 1 of the present application.

The existing backlight module usually fixes the light source on the backplane, it is generally necessary to reserve a wide gap between the light source and the light guide plate. On the one hand, the gap can avoid the friction between the light source and the light guide plate when assembling, and reduce/avoid the damage of the light guide plate; on the other hand, it can prevent the light guide plate from expanding and squeezing the light source after the heat emitted by the light source for a long time, to reduce/avoid display abnormalities. However, the distance between the light source and the light-entering surface of the light guide plate has a positive correlation effect on the brightness of the display device. FIG. 5 shows a schematic diagram of the brightness of the display device changing with the distance between the light source and light-entering surface of the light guide plate. In FIG. 5, the horizontal coordinate is the distance d between the light source and the light-entering surface of the light guide plate, the unit is mm, and the vertical coordinate is the brightness of the display device (display module), the unit is $cd/m^2$. As shown in FIG. 5, for any curve, the distance d between the light source and the light-entering surface of the light guide plate ranges from 0.1 mm to 1.0 mm, and the brightness of the display device decreases, that is, the farther the distance between the light source and the light-entering surface of the light guide plate, the lower the brightness of the display device. Due that in the existing backlight module, the distance between the light source and the light-entering surface of the light guide plate needs to be maintained 0.2 mm or even greater to reduce/avoid the above problems of the light source and the light guide plate, which inevitably leads to the lower brightness of the backlight module, and then the brightness of the display device applied to the backlight module is lower.

In order to solve the above problems, the backlight module provided in the present application provides with the connection layer, and the connection layer is arranged to be sandwiched between the light source and the light guide plate, and is in contact with the light source and the light guide plate respectively; the connection layer is formed based on a viscous material and is configured to transmit light emitted by the light source. Therefore, on one hand, the viscous material in the connection layer is relatively soft, which can achieve the buffering effect due that the viscous material is directly in contact with the light source, thus the light source will not produce adverse effects even if being squeezed; on the other hand, the gap between the light source and the light guide plate can also be filled by the connection layer, which is approximately equivalent to making the light source being closer to the light guide plate, so that most of the light emitted by the light source enters the light guide plate through the connection layer and then being emitted to outside, the brightness of the backlight module can be significantly improved and thereby the brightness of the display device applying the backlight module can be significantly improved, for example, it can increase the brightness of the display device by about 20%, and a high brightness display device has been implemented.

In one embodiment, as shown in FIG. 2, the material of the adhesive material includes a transparent adhesive 21.

The type of transparent adhesive mentioned above is not limited here, for example, the transparent adhesive can include an optically clear adhesive (OCA), a transparent high penetration Ultraviolet (UV) adhesive, etc.

The transparent adhesive of the adhesive is softer, and the transparent adhesive is softer than the protective adhesive in the sealant layer of the light source, that is, the hardness of the transparent adhesive is less than that of the protective adhesive in the sealant layer of the light source, so that the backlight module will not be squeezed to the sealant layer once it is squeezed. The hardness of the above transparent adhesive is not limited here. For example, the hardness of the above transparent adhesive can be ranged from 30 HB to 70 HB. Specifically, the hardness of the above transparent adhesive can be 30 HB, 40 HB, 50 HB, 60 HB or 70 HB, etc.

In the backlight module provided by the embodiment of the present application, on the one hand, the transparent adhesive is softer, and since the transparent adhesive is in direct contact with the light source, which can achieve the buffering effect due that the viscous material is directly in contact with the light source, thus the light source will not produce adverse effects even if being squeezed; on the other hand, the gap between the light source and the light guide plate can also be filled by the connection layer, which is approximately equivalent to making the light source being closer to the light guide plate, so that most of the light emitted by the light source enters the light guide plate through the connection layer and then being emitted to outside, the brightness of the backlight module can be significantly improved and thereby the brightness of the display device applying the backlight module can be significantly improved, for example, it can increase the brightness of the display device by about 20%, and a high brightness display device has been implemented. Further, it is simple and easy to implement.

In one embodiment, as shown in FIG. 3, the viscous material includes a transparent adhesive 21 and quantum dots 22, and the quantum dots 22 are doped in the transparent adhesive 21.

The quantum dots (also known as QDs) can be either red quantum dots, green quantum dots or blue quantum dots, depending on the actual application.

The specific material of the above quantum dots is not limited here, for example, it can include perovskite crystalline materials, or include composite materials containing metal nanoparticles, etc.

Figure 6:
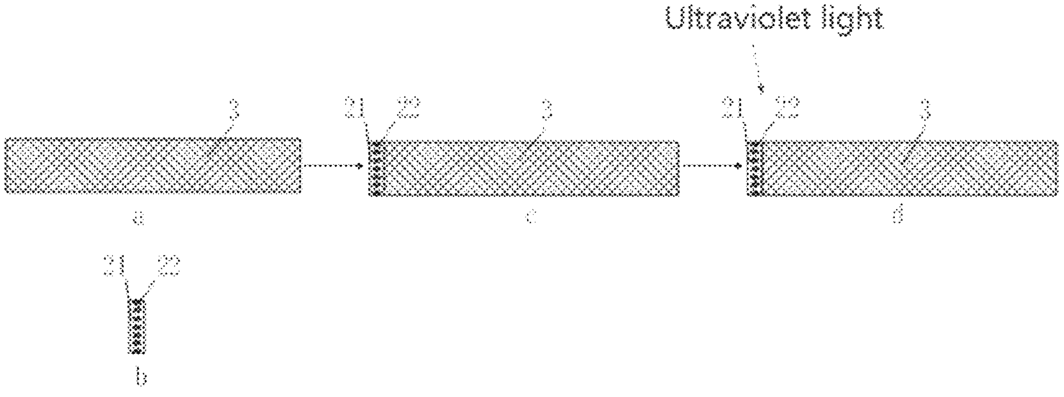
FIG. 6 is a first manufacturing process of an adhesive material and a light guide plate provided in Embodiment 1 of the present application.

The manufacturing processes of the viscous material and the light guide plate are not specified. For example, as shown in figure a in FIG. 6, providing the light guide plate 3; as shown in figure b in FIG. 6, doping quantum dots 22 in the transparent adhesive 21 to form the viscous material; at this time, the sequence of providing the light guide plate and forming the viscous material is not limited; the light guide plate can be provided before forming the viscous material, or the viscous material can be formed before providing the light guide plate, or providing the light guide plate and forming the viscous material at the same time; as shown in figure c in FIG. 6, coating the viscous material at the light-entering side of the light guide plate 3; and as shown in figure d in FIG. 6, performing a UV curing to form a light guide plate with the viscous material 3. It should be noted that high penetration UV adhesive can be used at this time, and the refractive index of UV adhesive after curing is about 1.5.

In the backlight module provided by the embodiment of the present application, on the one hand, the light source will not produce adverse effects even if it is squeezed, and while improving the product yield, the brightness of the backlight module can be significantly improved, and then the brightness of the display device applying the backlight module can be improved; on the other hand, the blue light emitted by the light source is converted into green light and red light through the quantum dots, and the wavelength distributions of green light and red light are very narrow, which can be well matched with the high transmittance band of the color filter in the liquid crystal display device, which can not only reduce the loss of light and effectively improve the light efficiency, but also achieve high color purity (saturation) of various colors of monochromatic light due that the wavelength distributions are very narrow, so that the color gamut is effectively improved, thus the color gamut of the backlight module can be effectively improved by doping the quantum dots in the transparent adhesive, for example, the color gamut can be increased to 110%, and the color gamut of the display device applying the backlight module is improved. Therefore, a display device with high brightness and high color gamut can be obtained.

In one embodiment, as shown in FIG. 4, the connection layer 2 includes a viscous layer and a quantum dot layer 23, and the viscous material in the viscous layer at least includes a transparent adhesive. The viscous layer includes a first sub viscous layer 24 and a second sub viscous layer 25. The first sub viscous layer 24 is in contact with the light source 1, and the second sub viscous layer 25 is in contact with the light guide plate 3. The quantum dot layer 23 is located between the first sub viscous layer 24 and the second sub viscous layer 25, and is in contact with the first sub viscous layer 24 and the second sub viscous layer 25 respectively.

The structure of the above quantum dot layer is not limited here. For example, the quantum dot layer can be a quantum dot film.

The viscous material in the viscous layer at least including the transparent adhesive means: the viscous material in the viscous layer only includes the transparent adhesive; alternatively, the viscous material in the viscous layer can include other substances, such as quantum dots, in addition to the transparent adhesive, and which is not limited here. For example, the material of the first sub viscous layer can be the same as that of the second sub viscous layer, such as the materials are the transparent adhesive or the materials include the transparent adhesive and the quantum dots; alternatively, the material of the first sub viscous layer can be different from that of the second sub viscous layer, for example, the material of the first sub-viscous layer is the transparent adhesive, the material of the second sub viscous layer includes the transparent adhesive and the quantum dots, or the material of the first sub-viscous layer includes the transparent adhesive and the quantum dots, and the material of the second sub viscous layer is the transparent adhesive, which is not limited here.

The manufacturing process of the viscous layer, the quantum dot layer and the light guide plate is not specified. For example, as shown in figure a in FIG. 7, providing the light guide plate 3; as shown in figure b in FIG. 7, coating the second sub viscous layer 25 on the light-entering side of the light guide plate 3 and performing a UV curing; as shown in figure c in FIG. 7, attaching the quantum dot layer 23 to the light-entering side of the second sub viscous layer 25; as shown in figure d in FIG. 7, coating the first sub viscous layer 24 on the light-entering side of the quantum dot layer 23 and performing a UV curing to form the light guide plate 3 with the viscous layer and the quantum dot layer. It should be noted that at this time, both the material of the first sub viscous layer and the material of the second sub viscous layer can use the high penetration UV adhesive, and the refractive index of the UV adhesive after curing is about 1.5.

In the backlight module provided by the embodiment of the present application, on the one hand, the light source will not produce adverse effects even if it is squeezed, and while improving the product yield, the brightness of the backlight module can be significantly improved, and then the brightness of the display device applying the backlight module can be improved; on the other hand, the blue light emitted by the light source is converted into green light and red light through the quantum dots, and the wavelength distributions of green light and red light are very narrow, which can be well matched with the high transmittance band of the color filter in the liquid crystal display device, which can not only reduce the loss of light and effectively improve the light efficiency, but also achieve high color purity (saturation) of various colors of monochromatic light due that the wavelength distributions are very narrow, so that the color gamut is effectively improved, thus the color gamut of the backlight module can be effectively improved by providing the quantum dot layer in the first sub viscous layer and the second sub viscous layer, for example, the color gamut can be increased to 110%, and the color gamut of the display device applying the backlight module is improved. Therefore, a display device with high brightness and high color gamut can be obtained.

In one embodiment, the material of the viscous material also includes a transparent graphene, and the transparent graphene is doped in the transparent adhesive. At this time, the lower end of the viscous material can be made to be in contact with the backplane, the heat of the surface of the PCB and the surface of the light guide plate bearing the light source is first laid flat by the viscous material, and then the backplane is used to dissipate the heat of the viscous material, so as to achieve the purpose of heat dissipation for both the light guide plate and the light source.

In one embodiment, the light source, the connection layer, and light guide plate are integrally formed.

Thus, on one hand, there is no need to first install the light source and then install the light guide plate during the assembly process, the process is saved, and there is no friction between the light source and the light guide plate during the assembly process, and the yield is improved; on the other hand, the light source and the light guide plate are fixed in advance to form as a whole, and there is no need to consider the gap between the light source and the light guide plate during the assembly process, and the assembly efficiency is high, and the distance between the light source and the light guide plate is uniform, which reduces/avoids the problem of uneven brightness of the display device; on the further hand, the light source and the light guide plate are bonded by the connection layer without the need to reserve gaps, so that the display device can achieve a narrower border. In addition, when the light guide plate is heated and expanded, the light guide plate will not directly squeeze the light source due that the transparent adhesive is softer, for example, the hardness of the transparent adhesive can include 30 HB to 70 HB, and the gap between the light source and the light guide plate can be provided smaller. The utilization rate of light is higher, and the brightness of the backlight module can be increased higher, which can make the brightness of the display device applying the backlight module higher.

In one embodiment, as shown in FIG. 8, the surface of the connection layer being in contact with the light source 1 is a first surface, the surface of the connection layer being in contact with the light guide plate 3 is a second surface, and at least one of all surfaces of the connection layer, except the first surface and the second surface, is provided with concave dots 10.

At least one of all surfaces of the connection layer, except the first surface and the second surface, being provided with concave dots means that: one of all surfaces of the connection layer, except the first surface and the second surface, is provided with concave dots; or, more than one of all surfaces of the connection layer, except the first surface and the second surface, are provided with concave dots; which are not limited here.

The amount of the concave dots mentioned above is not limited here. FIG. 8 shows that two of all surfaces of the connection layer, except the first surface and the second surface, are provided with concave dots 10.

It should be noted that, as shown in FIG. 8, the light source 1 can be arranged into the transparent adhesive 21, in which case the transparent adhesive 21 can cover at least part of the surface of the light source 1. In other embodiments, as shown in FIGS. 2 to 4, the surface of the light source 1 is in contact with the surface of the transparent adhesive 21, which is not limited here.

In the backlight module provided by the embodiment of the present application, the light source generally emits light in a fan shape, and by providing the concave dots on at least one of all surfaces of the connection layer except for the first surface and the second surface, the concave dots can fully reflect the light emitted by the light source, so as to enable as much light as possible to enter the light guide plate. As shown in FIG. 8, the light L1 emitted by the light source 1 passes through the concave dots 10 and becomes the light L2 entering into the light guide plate 3, which effectively improves the utilization rate of light, improves the brightness of the backlight module, and then improves the brightness of the display device applying the backlight module.

In one embodiment, as shown in FIG. 9, the absolute value of the difference value between the refractive index of the transparent adhesive and the refractive index of the material of the light guide plate ranges from 0.01 to 0.11. The closer the refractive index of the transparent adhesive is to the refractive index of the material of the light guide plate, the better the brightness gain effect of the backlight module, and then the brightness of the display device applying the backlight module can be significantly improved.

The absolute value of the difference value between the refractive index of the transparent adhesive and the refractive index of the light guide plate material is not limited here. For example, the absolute value of the difference value between the refractive index of the transparent adhesive and the refractive index of the light guide plate material can be 0.01, 0.04, 0.06, 0.09 or 0.11 and so on.

FIG. 8 shows the brightness values and increment values of a display device obtained a refractive index of the light guide plate material being about 1.49 and a refractive index of the transparent adhesive being 1.40, 1.45, 1.50, 1.55 and 1.60 respectively, as well as the brightness value of the display device obtained when there is no transparent adhesive. As shown in FIG. 9, when the refractive index of the transparent adhesive is about 1.45, the increment value of the display device is about 19.76%, which is closer to the increment value 20.36% of the display device applied with Polymethyl Methacrylate (PMMA).

In one embodiment, the color of the light emitted by the light source is blue. Thus, the blue light passes through the quantum dots or the quantum dot layer in the connection layer to be converted into green light and red light, and the wavelength distributions of green light and red light are very narrow, which can be well matched with the high transmittance band of the color filter in the liquid crystal display device, so as to reduce the loss of light and effectively improve the light efficiency.

It should be noted that when the material of the connection layer only includes the transparent adhesive, the color of the light emitted by the above light source can also be white, which can improve the light efficiency more effectively.

In one embodiment, as shown in FIGS. 2 to 4, the light source 1 is a side-light type light source. Thus, a high brightness and high color gamut side-light type backlight module can be obtained.

Embodiment 2

Figure 10:
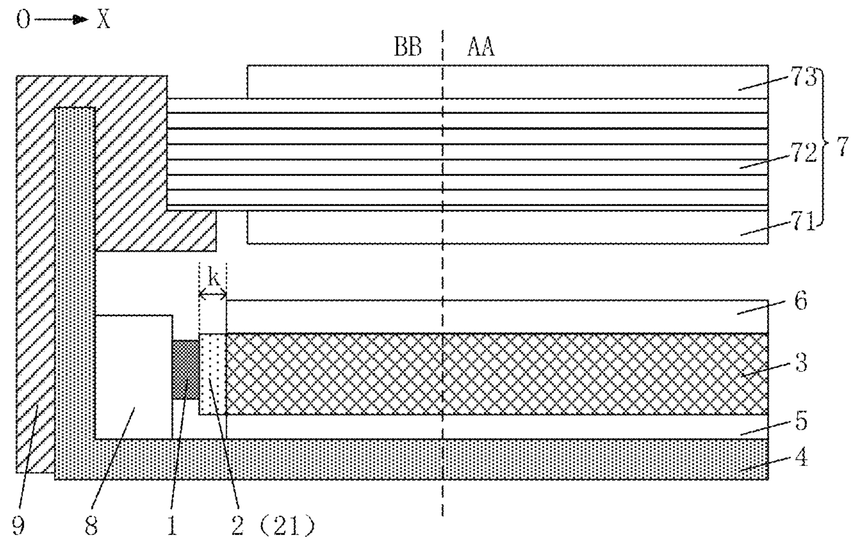
FIG. 10 is a structural schematic diagram of a first structure of a backlight module provided in Embodiment 2 of the present application.
Figure 11:
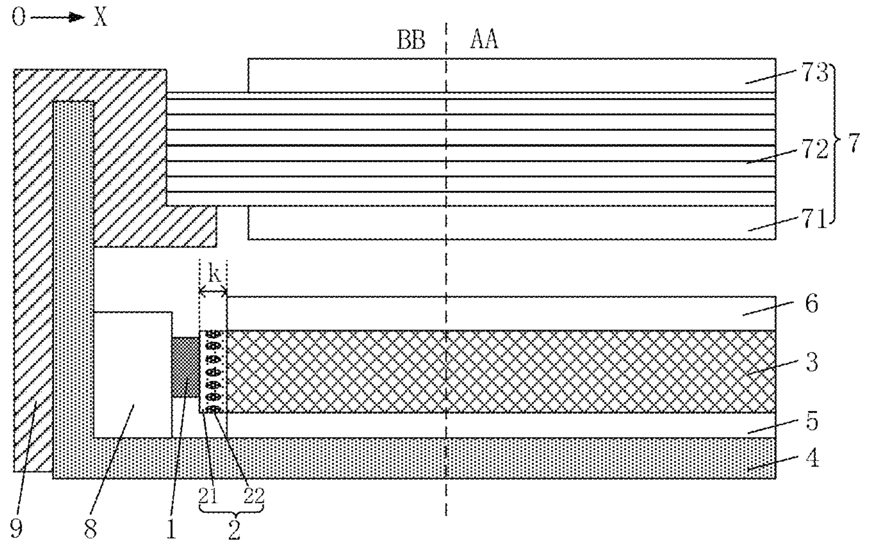
FIG. 11 is a structural schematic diagram of a second structure of a backlight module provided in Embodiment 2 of the present application.
Figure 12:
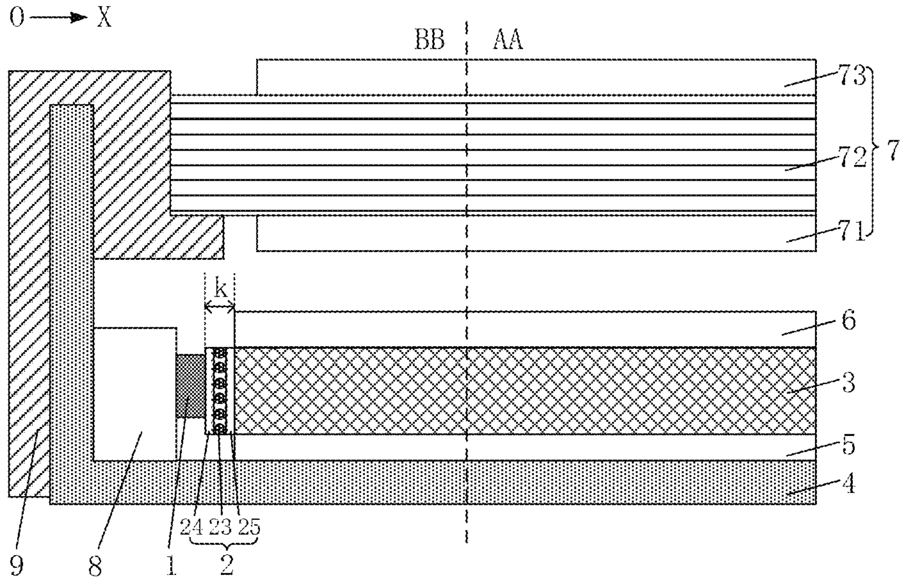
FIG. 12 a structural schematic diagram of a third structure of a backlight module provided in Embodiment 2 of the present application.

The present application embodiment provides a display device, as shown in FIGS. 10 to 12, the display device includes a display panel 7 and the backlight module described in Embodiment 1. The display panel 7 is located on the light-emitting side of the backlight module.

The display panel can be a liquid crystal display panel, and the specific type of the display panel is not limited here. As shown in FIGS. 10 to 12, the display panel 7 can include a first substrate 71, a display substrate 72 and a second substrate 73, where the display substrate can be a liquid crystal display substrate, and the display substrate includes an array substrate and a color film substrate. In addition, only the content related to the invention point is introduced here, and the rest of the structure can be obtained by referring to relevant technologies, which will not be detailed here.

It should be noted that, as shown in FIGS. 10 to 12, the display device includes an active area (AA) and a non-active area (BB) connected to the active area, and connection layer 2 can be arranged in the non-active area.

The display device can be a flexible display device (also known as a flexible screen), or a rigid display device (that is, a display screen that cannot be bent), and which is not limited here. The display device can be a liquid crystal display device. The display device can be any product or component with display function such as a TV, a digital camera, a mobile phone, a tablet computer, etc. The above display device can also be applied to identification, medical equipment and other fields, the product has been promoted or has a good promotion prospect includes security identity authentication, smart door lock, medical image acquisition, etc.

When the display device includes the backlight module in Embodiment 1, the connection layer can be arranged between the light source and the light guide plate and is in contact with the light source and the light guide plate respectively, the connection layer at least includes the adhesive material, and the connection layer has a small width along a direction parallel to the light guide plate, the connection layer can not only play a buffering role, so that the light source will not produce adverse effects even if being squeezed; but also the connection layer can fill the gap between the light source and the light guide plate, it is approximately equivalent to making the light source being closer to the light guide plate since the width of the connection layer can be small along the direction parallel to the light guide plate; thus most of the light emitted by the light source enters the light guide plate through the connection layer and emits form the light guide plate, which can significantly improve the brightness of the backlight module, and then improve the brightness of the display device applying the backlight module. Thus, the display device can be made with high brightness, high color gamut, good display effect, long life, high stability, high contrast, good imaging quality, and high product quality.

The above is only an optional embodiment of the present application and is not intended to limit the present application. Any modification, equivalent replacement, improvement, etc. made within the spirit and principles of the present application shall be covered by the present application.

What is claimed is:

1. A backlight module, comprising:

a light source;

a light guide plate; and a connection layer sandwiched between the light source and the light guide plate, and the connection layer is in contact with the light source and the light guide plate, respectively;

wherein the connection layer is formed based on a viscous material and is configured to transmit a light emitted by the light source; and wherein a surface of the connection layer is in contact with the light source is a first surface, and a surface of the connection layer is in contact with the light guide plate is a second surface; and at least one of all surfaces of the connection layer, excluding the first surface and the second surface, is provided with concave dots.

2. The backlight module according to claim 1, wherein the viscous material comprises a transparent adhesive; or the viscous material comprises a transparent adhesive and quantum dots, and the quantum dots are doped in the transparent adhesive.

3. The backlight module according to claim 1, wherein the connection layer comprises a viscous layer and a quantum dot layer, and the viscous material of the viscous layer at least comprises a transparent adhesive; the viscous layer comprises a first sub viscous layer and a second sub viscous layer, and the first sub viscous layer is in contact with the light source, and the second sub viscous layer is in contact with the light guide plate; and the quantum dot layer is located between the first sub viscous layer and the second sub viscous layer, and configured to be in contact with the first sub viscous layer and the second sub viscous layer, respectively.

4. The backlight module according to claim 2, wherein the viscous material further comprises a transparent graphene, and the transparent graphene is doped in the transparent adhesive.

5. The backlight module according to claim 1, wherein the light source, the connection layer, and the light guide plate are integrally formed.

6. The backlight module according to claim 2, wherein an absolute value of a difference value between a refractive index of the transparent adhesive and a refractive index of a material of the light guide plate is ranged from 0.01 to 0.11.

7. The backlight module according to claim 2, wherein a color of the light emitted by the light source is blue.

8. The backlight module according to claim 1, wherein the light source is a side-light type light source.

9. The backlight module according to claim 3, wherein the viscous material further comprises a transparent graphene, and the transparent graphene is doped in the transparent adhesive.

10. The backlight module according to claim 3, wherein an absolute value of a difference value between a refractive index of the transparent adhesive and a refractive index of a material of the light guide plate is ranged from 0.01 to 0.11.

11. The backlight module according to claim 3, wherein a color of the light emitted by the light source is blue.

12. The display device according to claim 9, wherein the viscous material comprises a transparent adhesive; or the viscous material comprises a transparent adhesive and quantum dots, and the quantum dots are doped in the transparent adhesive.

13. A display device, comprising a display panel and a backlight module, the display panel is located at a light-emitting side of the backlight module, and the backlight module comprises:

a light source;

a light guide plate; and a connection layer, sandwiched between the light source and the light guide plate, and being in contact with the light source and the light guide plate respectively;

wherein the connection layer is formed based on a viscous material and is configured to transmit a light emitted by the light source; and wherein a surface of the connection layer is in contact with the light source is a first surface, and a surface of the connection layer is in contact with the light guide plate is a second surface; and at least one of all surfaces of the connection layer, excluding the first surface and the second surface, is provided with concave dots.

14. The display device according to claim 13, wherein the connection layer comprises a viscous layer and a quantum dot layer, and the viscous material of the viscous layer at least comprises a transparent adhesive; the viscous layer comprises a first sub viscous layer and a second sub viscous layer, and the first sub viscous layer is in contact with the light source, and the second sub viscous layer is in contact with the light guide plate; and the quantum dot layer is located between the first sub viscous layer and the second sub viscous layer, and configured for being in contact with the first sub viscous layer and the second sub viscous layer, respectively.

15. The display device according to claim 14, wherein the viscous material further comprises a transparent graphene, and the transparent graphene is doped in the transparent adhesive.

16. The display device according to claim 13, wherein the light source, the connection layer, and the light guide plate are integrally formed.

17. The display device according to claim 14, wherein an absolute value of a difference value between a refractive index of the transparent adhesive and a refractive index of a material of the light guide plate is ranged from 0.01 to 0.11.

18. The display device according to claim 15, wherein a color of the light emitted by the light source is blue.

* * * * *